UNITED STATES PATENT OFFICE.

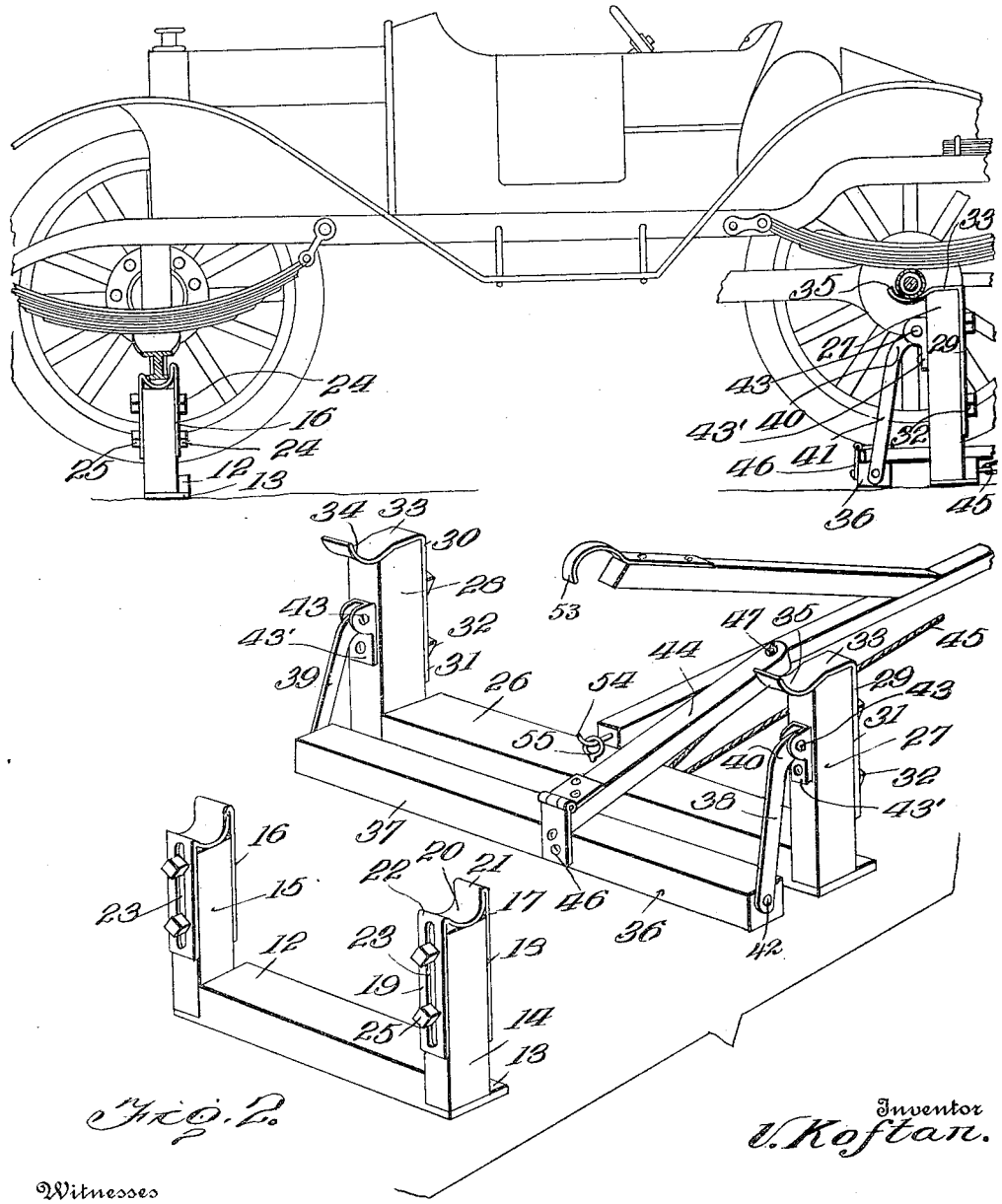

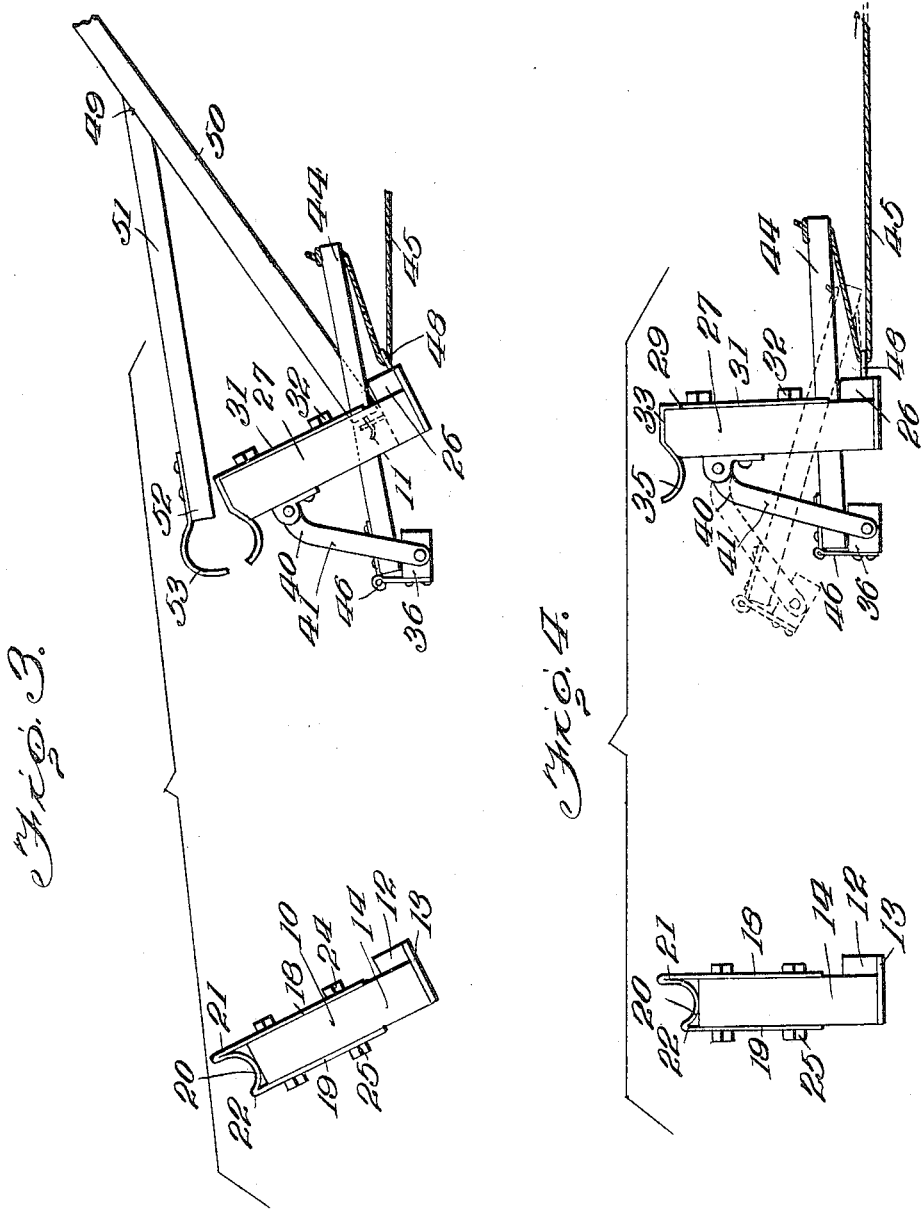

VINCENT KOFTAN, OF TYNDALL, SOUTH DAKOTA.

LIFTING-JACK FOR AUTOMOBILES.

1,134,140. Specification of Letters Patent. Patented Apr. 6, 1915.

Application filed February 28, 1914. Serial No. 821,714.

*To all whom it may concern:*

Be it known that I, VINCENT KOFTAN, citizen of the United States, residing at Tyndall, in the county of Bonhomme and State of South Dakota, have invented certain new and useful Improvements in Lifting-Jacks for Automobiles, of which the following is a specification.

The present invention relates to new and useful improvements in lifting jacks for automobiles, and has particular reference to that type which are designed especially for use in garages.

The principal object of the invention is to provide a novel form of lifting jack which consists essentially in two horses which may be applied to the front and rear axles of the automobile for lifting all four wheels off the floor, thereby relieving the tires of all weight while the automobile is in storage.

A further object of the invention is to equip the horse which is designed for application to the rear axle of the automobile with a novel form of stabilizing member which is mounted for swinging movement and is adapted, when in normal position, to prevent the tilting of the rear horse, but is also adapted, when swung upwardly, to permit the rear horse to tilt for the purpose of allowing the automobile to be lowered to the ground.

A still further object is to construct a lifting or hoisting apparatus of the character described with such regard to number, proportion and arrangement of parts that it may be cheaply manufactured, will be durable and efficient in its action, and may be readily and quickly employed in lifting and supporting any automobile or vehicle above the ground or floor.

The above and additional objects are accomplished by such means as are illustrated in the accompanying drawings, described in the following specification, and then more particularly pointed out in the claims, which are appended hereto and form a part of this application.

With reference to the drawings, wherein there has been illustrated the preferred embodiment of this invention as it is reduced to practice, and throughout the several views of which similar reference numerals designate corresponding parts, Figure 1 is a side elevation of an automobile showing the lifting apparatus in supporting position, the adjacent wheels of the automobile being removed to more clearly disclose the manner in which the two horses of the apparatus are applied to the front and rear axles of the automobile; Fig. 2 is a perspective view showing the horses in the relation which they bear to one another when in supporting position beneath an automobile; Fig. 3 is a side elevation of the two horses, illustrating the manner in which they are applied beneath the front and rear axles of an automobile prior to the lifting operation; and Fig. 4 is a side elevation showing the two horses in the position which they assume after the lifting operation has been performed and the automobile has been lifted from the ground with its forward and rear axles supported by the two horses. This figure also illustrates by solid and dotted lines the manner in which the stabilizing leg or bar is manipulated to either prevent or permit the tilting of the rear horse.

Before taking up the detailed description of the drawings, I desire to explain that, while I have designed my invention particularly for use in connection with automobiles, have illustrated, and will hereinafter describe it in that connection, it may, nevertheless, be employed with equal efficiency for jacking up farm wagons, carriages, or any other vehicles without requiring any alterations in the structure or relative arrangement of its various parts.

In the embodiment of the invention shown in the accompanying drawings, I have provided two horses which are designated as entireties by the numerals 10 and 11. The member 10 is adapted for application to the front axle of the automobile, while the member 11 is designed for application to the rear axle of the automobile.

The horse member 10 consists essentially, as best illustrated in Fig. 2, in a body member or base bar 12 which is preferably formed from relatively heavy scantling, although some other material, such as steel or iron, may be employed, if found desirable. The terminals of the base member 12 are cut-away as at 13 to receive the terminals of the uprights or legs 14 and 15. These leg members 14 and 15 are also formed from lengths of scantling, although they may also be substituted by metallic legs. Embracing the upper end and the sides of each of the members 14 and 15 is an adjustable bracket which is adapted to receive the automobile axle. These brackets are indicated at 16 and 17, and being substantially identical in construction it is deemed necessary to describe only one of them in detail, the member 17 being chosen in this instance.

The bracket 17 is formed from a length of relatively heavy sheet metal, which is first bent to a substantially U-shape, forming the arms 18 and 19. The bight portion of the member is bent inwardly to produce an axle receiving cup or socket 20, and is so formed that one side or portion of the cup, indicated at 21, extends above the other side portion 22. The purpose in thus forming the axle receiving socket 20 will be hereinafter more fully explained in that portion of the specification devoted to the description of the application and the removal of the horse during the raising and lowering of the automobile. Each of the arms 18 and 19 of the two brackets 16 and 17 are longitudinally slotted, as indicated at 23, so that the operator may, by loosening the nuts 24 of the bracket securing bolts 25, adjust the brackets to the desired elevation, and then by re-tightening the nuts hold them fixed in such adjusted position. In this connection, it may be well to explain that the preferred embodiment of the apparatus is so constructed that the sockets 20 will rest on the upper terminals of the legs 14 and 15 when the apparatus is applied to any ordinary automobile of standard axle clearance.

The horse member, indicated at 11, is somewhat similar to the member 10 in construction, consisting as it does in a base member or bar 26, the terminals of which are cut-away to receive a pair of vertical legs 27 and 28. Brackets, indicated at 29 and 30, are secured to the legs 27 and 28 to receive the rear axle of the automobile. These brackets are substantially identical in construction, each consisting in an elongated strip of relatively heavy metal, which is bent intermediate its length into a substantially L-shape. The longer leg of each bracket, indicated at 31, is longitudinally slotted to receive bolts or some other similar fastening devices 32, which are inserted in the leg members 27 and 28, and permit the operator to secure the horizontal leg 33 at the desired elevation. These horizontal legs 33 of the brackets are of such length that they extend beyond the forward edges of the horse legs 27 and 28. That portion of each member 33 which extends beyond the edge of the horse leg is bent to produce a cup-like socket, as indicated at 34 and 35. These sockets are adapted to receive the rear axle of the automobile, as best shown in Fig. 1.

A stabilizing leg, indicated as a whole at 36, is swingingly attached to the horse 11 for the purpose of preventing the rear horse from tilting when the automobile is supported above the floor or ground. This stabilizing leg includes a body bar 37 and a pair of terminal links 38 and 39. The members 38 and 39 are formed from strips of sheet metal, and are bent intermediate their length, as at 40 in Fig. 1, so that the lower portion of the links, indicated at 41, extend angularly in spaced relation to the legs 27 and 28, when the device is applied to the automobile. The lower terminals of the links are secured to the terminals of the bar 37 by bolts or similar fastening devices, indicated at 42, and are pivotally connected at their upper terminals to the upper portions of the horse legs 27 and 28 by pivot pins 43 carried by the attaching brackets 43'.

When the rear horse 11 is in position to support the rear axle of the automobile in the manner shown in Fig. 1, the stabilizing member 36 is allowed to swing downwardly so that the bar 37 will rest on the ground or floor. The bar 37 thus forms in connection with the member 26 spaced supporting members for the rear axle. In this connection, it is to be noted that the axle is received within the sockets 34 and 35 of the brackets 30 and 31, and that inasmuch as these sockets lie beyond the edge of the legs 27 and 28, the normal tendency of the weight of the machine would be to tilt the rear horse forwardly, allowing the wheels to drop down onto the ground. Such an occurrence, however, is prevented by equipping the rear horse with the swinging stabilizing leg 36, as will be appreciated upon reference to Fig. 1 of the drawings.

It is, of course, necessary to provide means whereby the leg 36 may be swung upwardly out of engagement with the ground to permit the tilting of the rear horse 11 when it is desired to lower the automobile to the ground. For this purpose I preferably employ a bar member 44 and a rope or similar flexible element 45, the bar member 44 being hinged, as at 46, to the body bar 37 of the swinging leg and extending rearwardly above the bar 26. The flexible member 45 is connected, as by a pin 47, to the rear terminal of this bar 44, and is passed through a staple or equivalent device 48 which is secured to the rear face of the bar 26, as best shown in Fig. 4. It will be seen by referring to Fig. 4 that a rearward pull on the cable 45 will project the bar 44 forwardly, with the resultant forward and upward swinging movement of the auxiliary leg member 36, as indicated in dotted lines in Fig. 4. When the leg member 36 is thus swung upwardly, the weight of the machine being disposed remote from the center line of the legs 27 and 28 will effect the tilting or swinging of the rear horse, permitting the automobile wheels to drop to the ground.

It now becomes apparent that it is necessary to provide means whereby the automobile may be lifted up onto the horses and with its wheels spaced above the ground. This lifting or jacking of the machine is accomplished by a lifting lever, designated as an entirety by the numeral 49. The lever 49 is constructed from a relatively long strip of scantling 50, secured to which is a hook arm 51 which extends at a forward and upward angle to the member. The forward terminal 52 of the member 51 lies beyond the forward terminal of the member 50, as best shown in Fig. 3, and is equipped with a metallic hook member 53. This hook is designed to be engaged with the rear axle of the automobile during the raising and lowering thereof, and for this reason it is necessary to extend the forward terminal 52 of the member 51 beyond the forward terminal of the member 50, since the forward terminal of the member 50 is adapted to be engaged with the bar 26 at a point somewhat behind the rear axle of the automobile.

As a means for pivotally and detachably connecting the operating lever 49 to the member 26, I preferably provide the member 50 with the hook 54, which is engageable in a suitable eyelet or equivalent device 55 carried by the member 26.

Having thus described the actual details of construction and arrangement of the various parts of my apparatus, I will now explain the manner in which the horses are applied to or removed from the automobile.

When it is desired to jack up the vehicle, the horse 10 is placed under the automobile, and is positioned with the sockets 20 of the supporting brackets 16 and 17 in engagement with the front axle thereof. When the horse 10 is first applied to the axles, it is tilted forwardly, in the manner shown in Fig. 3, so that when the machine is pulled rearwardly in a manner to be hereinafter described, the front portion of the machine will be swung upwardly as the horse swings rearwardly to its normal vertical position. After the horse 10 has been positioned, the operator applies the horse 11 to the rear axle, engaging the sockets 34 and 35 with the axle, and tilting the horse forwardly, as shown in Fig. 3. The member 50 is then engaged with the bar 26 by engaging the hook 54 in the member 55, and at the same time the hook 53 is engaged over the rear axle. It will be seen that a downward pressure on the free end of the member 50 will tend to pull the vehicle rearwardly toward the operator of the lifting lever. This rearward pull on the automobile will, of course, effect the rearward swinging of the horses 10 and 11, which, when they have reached a vertical position, as shown in Fig. 4, will have lifted the vehicle wheels out of engagement with the ground. As the horses are thus pulled or swung rearwardly to a vertical position, the auxiliary stabilizing leg 36 will swing downwardly by gravity until the bar 37 engages the ground, in the manner shown in both Figs. 1 and 4. The operator may then remove the lifting lever 49, and the horses 10 and 11 will support the automobile in the desired elevated position. Inasmuch as the vertical weight line of the rear portion of the machine passes between the bars 37 and 26, due to the particular location of the sockets 34 and 35, it will be seen that the pressure on the bars 37 and 26 will be approximately equalized, and that inasmuch as the supporting base offered by the rear leg is relatively broad, due to the spacing of the bars 37 and 26, there will be no possibility of the automobile dropping to the ground until the operator moves the auxiliary stabilizing leg 36 upwardly, spacing it from the ground, and, consequently, destroying the equilibrium of the rear horse.

When the operator desires to lower the machine down to the ground, it is necessary to first apply the lifting lever 49, in the manner hereinbefore described, and to exert downward pressure on the lever. Such downward pressure will tend to swing the legs 27 and 28 of the horse 11 into exact vertical position, relieving the bar 37 of the weight which it has previously sustained, and permitting the operator to swing this bar upwardly by pulling the cable 45. As soon as the bar has been drawn upwardly into the position shown in dotted lines in Fig. 4, the operator releases the lever 49, and the machine, by reason of the disposition of its weight, with respect to the rear horse member, moves forwardly, and drops onto the ground.

From the foregoing description, it will be seen that it is necessary to make the links 38 and 39 of such length that the bar 37, when in its lowermost position, is disposed a slight distance above the bottom face of the member 26. This arrangement of the bar 36 is necessary in order that all weight may be removed from the bar 37 to permit the swinging of this member when the operator pulls the vehicle rearwardly to dispose the legs 27 and 28 of the rear horse 11 in exact vertical position.

As has been hereinbefore explained, this apparatus may be applied to vehicles constructed with varying axle clearance by adjusting the brackets to the necessary elevation.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that various minor changes in details of construction, proportion and arrangement of parts may be resorted to, when required, without sacrificing any of the advantages of this invention, as defined in the appended claims.

What is claimed is:—

1. An apparatus of the class described including a pair of horses adapted to support the front and rear axles of a vehicle, vertically adjustable axle receiving brackets carried by each of the horses, an auxiliary stabilizing member swingingly connected to one of the horses, said stabilizing member normally gravitating to engage the ground or supporting surface on which the horses are placed, and means for swinging the free extremity of the stabilizing member upwardly to permit the tilting of the horses.

2. An apparatus of the class described including a pair of horses adapted to support the front and rear axles of the vehicle, vertically adjustable axle receiving brackets carried by each of the horses, an auxiliary stabilizing member swingingly connected to one of the horses, said stabilizing member normally gravitating to engage the ground or supporting surface on which the horses are placed, and means for swinging the free extremity of the stabilizing member upwardly to permit the tilting of the horses, said means including a bar member pivoted to the stabilizing member, a flexible element connected to the bar, and a staple carried by the horse to which the stabilizing member is attached and receiving the flexible element.

3. An apparatus of the character described including a pair of horses adapted to support the front and rear axles of a vehicle, a pair of axle receiving brackets carried by the legs of one horse, said brackets being in vertical alinement with said legs, a pair of laterally offset axle receiving sockets carried by the legs of the other horse, a stabilizing member freely attached to said last-mentioned horse and normally gravitating to engage the ground, whereby to prevent the tilting of the said last mentioned horse when the vehicle axle is supported in the sockets thereof, and means for swinging the free extremity of the said stabilizing member upwardly out of engagement with the ground whereby the horse to which the stabilizing member is attached will be tilted by the weight of the vehicle.

4. An apparatus of the character described including a horse, a pair of laterally offset vertically adjustable axle receiving brackets carried by the legs of the horse, a stabilizing bar, links pivotally connecting the stabilizing bar to the horse, a bar hinged to the stabilizing bar, and a cable connected to the bar and operable for projecting the bar forwardly to swing the stabilizing member upwardly, said stabilizing member normally falling by gravity to engage the ground whereby the horse is held against tilting when a weight is disposed in the sockets thereof.

5. An apparatus of the character described including a horse having a pair of vertically disposed leg members, a pair of axle receiving brackets carried by the legs, each of said brackets consisting of a strip of metal bent into a substantially L-shape and having its horizontal leg terminally curved to form an axle receiving socket, the vertical leg of said socket being disposed against the vertical face of one of the horse legs whereby the axle receiving socket of the horizontal leg is laterally offset with respect to the horse leg, fastening means for securing the axle receiving brackets in adjusted position, and a swingingly mounted stabilizing member carried by the horse and normally engaging the ground for supporting the horse against tilting.

6. An apparatus of the character described including a horse, vertically adjustable axle receiving brackets carried by the horse, a swinging stabilizing member attached to the horse, means for swinging the stabilizing member upwardly to permit the tilting of the horse, a lever detachably engageable with the horse, and a hook carried by the lever and adapted to engage with the axle of the vehicle to which the horse is applied for pulling the vehicle rearwardly to cause the horse to swing upwardly to vertical position, said stabilizing member being adapted to swing by gravity into engagement with the ground when the horse is swung to vertical position whereby the horse is held against tilting until the stabilizing member is again swung up.

7. An apparatus of the character described including a horse provided with vertically adjustable brackets adapted to engage an axle upon one side of the vertical plane of the horse, and a stabilizing member freely connected to the horse upon the side thereof adjacent the engaging portions of said brackets, said stabilizing member normally gravitating to engage the ground or other surface supporting the horse.

8. An apparatus of the character described including a horse provided with vertically adjustable brackets adapted to engage an axle upon one side of the vertical plane of the horse whereby the horse will normally tend to tilt from the vertical, and a stabilizing member freely connected to one side of the horse and normally supported thereby above the ground or other surface supporting the horse, said stabilizing member normally gravitating to engage the ground in the path of the tilting movement of the horse.

In testimony whereof I affix my signature in presence of two witnesses.

VINCENT KOFTAN. [L. S.]

Witnesses:
J. F. WEISSER,
VIC. F. KREYCIK.

Copies of this patent may be obtained for five cents each, by addressing the "Commissioner of Patents, Washington, D. C."